(12) United States Patent
Imai

(10) Patent No.: US 6,950,255 B2
(45) Date of Patent: Sep. 27, 2005

(54) METHOD AND APPARATUS FOR EVENT MANAGEMENT IN A DISK DRIVE

(75) Inventor: Hiroshi Imai, Tachikawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 127 days.

(21) Appl. No.: 10/465,858

(22) Filed: Jun. 20, 2003

(65) Prior Publication Data

US 2004/0001272 A1 Jan. 1, 2004

(30) Foreign Application Priority Data

Jun. 28, 2002 (JP) ........................................ 2002-189941

(51) Int. Cl.⁷ .......................... G11B 27/36; G11B 19/02; G06F 1/26
(52) U.S. Cl. ........................... 360/31; 360/69; 713/323; 714/1
(58) Field of Search .............................. 360/31, 69, 51, 360/53; 714/57, 36, 5, 6, 7, 42, 769, 770, 1; 711/167, 100, 111; 702/185; 713/320, 323, 324

(56) References Cited

U.S. PATENT DOCUMENTS 3,704,363 A    11/1972   Salmassy et al.
6,405,329 B1 *  6/2002   Colligan et al. ............... 714/57

FOREIGN PATENT DOCUMENTS

| DE | 2 227 150 | 12/1972 |
|----|-----------|---------|
| JP | 2-202610 | 8/1990 |
| JP | 2-245837 | 10/1990 |
| JP | 3-222162 | 10/1991 |
| JP | 9-320209 | 12/1997 |
| JP | 10-162528 | 6/1998 |
| JP | 10-301816 | 11/1998 |
| JP | 2001-60370 | 3/2001 |
| JP | 2001-189060 | 7/2001 |
| JP | 2001-332039 | 11/2001 |

OTHER PUBLICATIONS

Search and Examination Reports, dated Dec. 22, 2003, from the Austrian Patent Office for Austrian Patent Application No. 200303224-0.

Japanese Office Action for Patent Appln. No. 2002-189941, dated Oct. 5, 2004.

* cited by examiner

Primary Examiner—Andrew L. Sniezek
(74) Attorney, Agent, or Firm—Pillsbury Winthrop Shaw Pittman LLP

(57) ABSTRACT

A disk drive is disclosed which has an event management function. At an event occurring time such as an error generation, the disk drive records the event information together with time data. A CPU of the disk drive is configured to, at a power ON time, allow the time data which is received from a host system to be stored in a memory. At the time of an error occurring, the CPU, while using the time measured by an internal timer and time data, generates time data which is synchronized with the internal time of the host system.

11 Claims, 4 Drawing Sheets

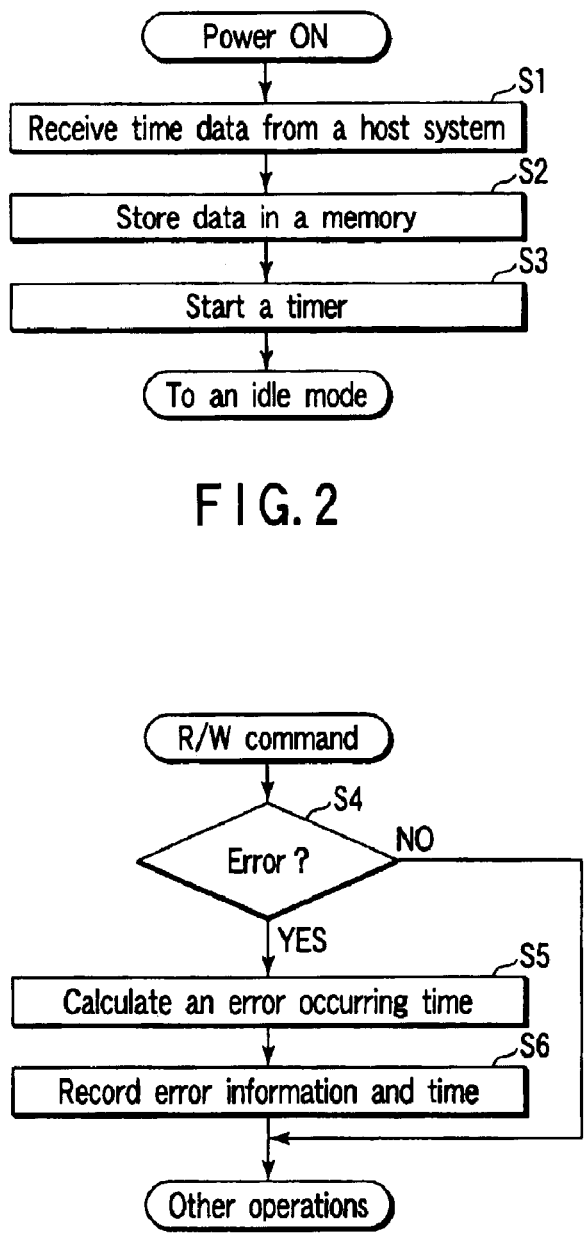
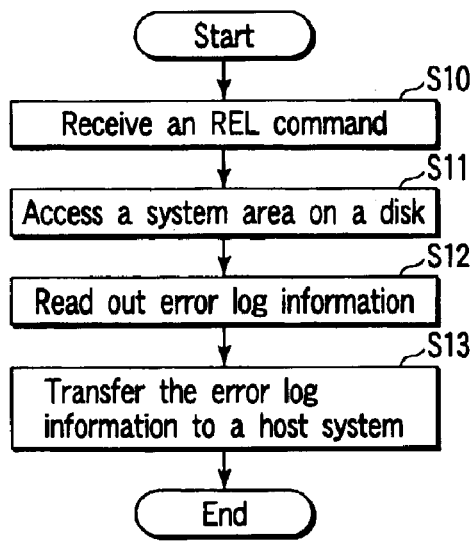
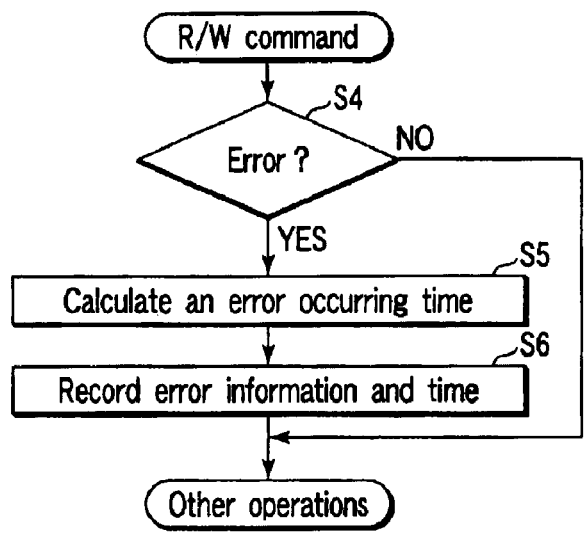
FIG. 2
FIG. 5
FIG. 3

Error date structure

| Byte | Descriptions |
|---|---|
| n | Reserved |
| n+1 | Content of the Error register after command completion occurred. |
| n+2 | Content of the Sector Count register after command completion occurred. |
| n+3 | Content of the Sector Number register after command completion occurred. |
| n+4 | Content of the Cylinder Low register after command completion occurred. |
| n+5 | Content of the Cylinder High register after command completion occurred. |
| n+6 | Content of the Device/Head register after command completion occurred. |
| n+7 | Content written to the Status register after command completion occurred. |
| n+8 | Timestamp Month |
| n+9 | Timestamp Date |
| n+10 | Timestamp hour |
| n+11 | Timestamp minutes |
| n+12 | Timestamp second |
| n+3–n+26 | Reserved |
| n+27 | State |
| n+28 | Life timestamp (least significant byte) |
| n+29 | Life timestamp (most significant byte) |

Bytes n+1 through n+7 are grouped as 300. Bytes n+8 through n+12 are grouped as 301.

FIG. 4

METHOD AND APPARATUS FOR EVENT MANAGEMENT IN A DISK DRIVE

CROSS-REFERENCE TO RELATED APPLICATIONS

This application is based upon and claims the benefit of priority from the prior Japanese Patent Application No. 2002-189941, filed Jun. 28, 2002, the entire contents of which are incorporated herein by reference.

BACKGROUND OF THE INVENTION

1. Field of the Invention

The present invention relates generally to the field of disk drives and, in particular, to an event management technique using time information.

2. Description of the Related Art

Generally, a typical hard disk drive has a built-in function to detect an error as one of the events occurring in a read/write operation, etc., and record the error information.

In general, in the disk drive, error log information (error log file) including various kinds of error information is stored in a system area on a disk medium serving as a recording medium. The system area comprises, for example, a recording area corresponding to a few tracks on the outermost peripheral side on the disk medium and is distinguished from a recording area of normal user data.

Further, in a conventional disk drive, a so-called turned-ON time from a power ON time to a power OFF time is measured and additively integrated to allow a resultant integrated time to be recorded on the recording medium. At an error occurring time, not only error information indicating an error content but also the turned-ON time is recorded as time stamp information.

A host system (a personal computer, etc.) can recognize the error content by reading the error information and turned-ON time from the disk drive, as required.

However, the host system can recognize an error occurring timing only by the use of a relative time which is a turned-ON time of the disk drive. In other words, the host system cannot recognize, in association with an internal time (time of day, date and year) of the system, the occurrence of an event such as an error occurring in the disk drive.

BRIEF SUMMARY OF THE INVENTION

In accordance with one embodiment of the present invention there is provided a disk drive including facilities for event management, that is, including means configured to, at an event occurring time, generate time data synchronized with an external time and record, together with the time data, any event information on an error occurrence, etc.

The time data constitutes a time stamping information meaning the time of day, date and year at which time an event occurs in the disk drive.

The disk drive comprises a disk medium configured to record data; a read/write unit configured to perform a read/write operation on data on the disk medium; a timer unit configured to generate time data synchronized with a time from outside the drive; and an event controller configured to, when a given event occurs in the drive, record event information indicating the event content and time data indicating the event occurrence time in a correspondence form.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart for explaining the steps of a time data receiving process relating to the first embodiment of the present invention;

FIG. 3 is a flowchart for explaining the steps of an error process relating to the first embodiment;

FIG. 4 shows one practical form of error information relating to the first embodiment;

FIG. 5 shows the steps of a read error log command process relating to the first embodiment;

DETAILED DESCRIPTION OF THE INVENTION

The embodiments of the present invention will be explained below with reference to the accompanying drawing.

(First Embodiment)

Figure 1:
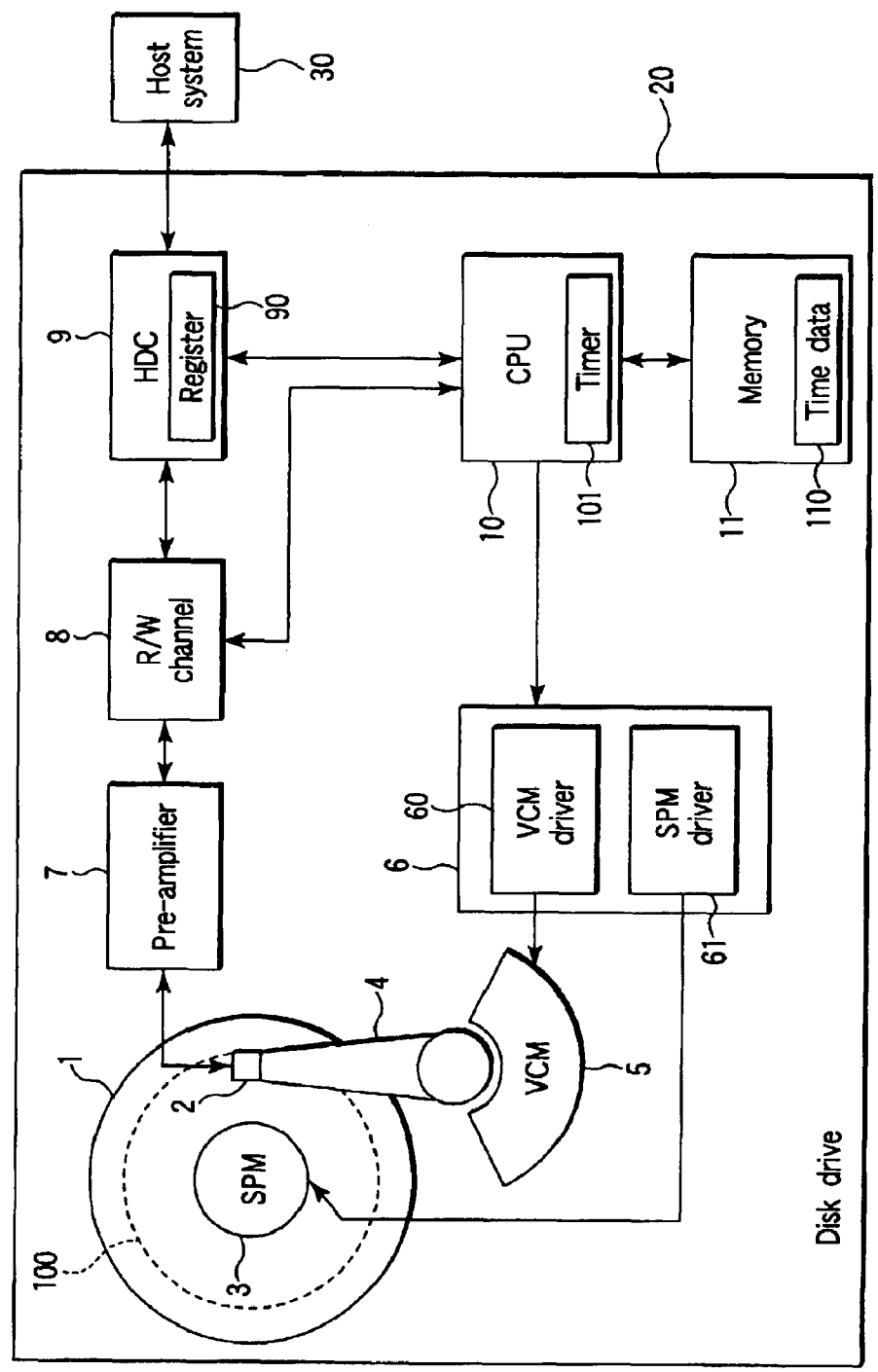
FIG. 1 is a block diagram showing a structure of a disk drive relating to respective embodiments of the present invention.

FIG. 1 is a block diagram showing a major section of a disk drive 20 relating to the present invention.

A present disk driver 20 comprises a hard disk drive (HDD) using a magnetic disk medium 1 as a data recording medium 1. The disk drive medium 1 is mounted on a spindle motor (SPM) 3 and configured to be rotated at high speed. On the disk medium 1, many tracks are formed as a data recording area.

A few tracks on the outermost peripheral side of the disk medium 1 are used as a system area 100 for recording data other than normal user data. As will be set out below, various kinds of management information, such as error log information (error log file) and turned-ON time information, are recorded on the system area 100.

The present disk drive 20 has a magnetic head 2 for performing a data read/write operation on a disk medium 1. The magnetic head 2 is mounted on an actuator 4. The actuator 4 is moved, under control, over the disk medium 1 in a radial direction by means of a voice coil motor (VCM) 5. The VCM 5 is supplied with a drive current under a VCM driver 60 in a motor driver IC 6.

The motor driver IC 6 includes not only the VCM driver 60 but also an SPM driver 61 for driving the SPM 3. A CPU 10 controls the SPM 3 and VCM 5 through the motor driver IC 6.

A magnetic head 2 is of such a structure as to have a read head and write head mounted on a common slider, the read head performing a read operation and write head performing a write operation. The actuator 4 is driven under control of a servo system with the CPU 10 as a main element and sets the magnetic head 2 to a target position (target track) on the disk medium 1.

In addition to such a head disk medium assembly, the disk drive 20 also includes a circuit system having a pre-amplifier circuit 7, R/W channel 8, disk controller (HDC) 9, CPU 10 and memory 11.

The pre-amplifier circuit 7 has a read amplifier and write amplifier, the read amplifier being configured to amplify a read signal which is output from the read head. The write amplifier convents a write data signal which is output from the R/W channel 8 to a write current signal and sends a resultant signal to the write head. The R/W channel 8 is comprised of a signal processing IC for processing a read/write data signal (including a servo data signal).

The CPU 10 is comprised of a main control device of the drive and, under its control, performs a control operation of the servo system, normal read/write operation control, and error management (event management) operation relating to the present embodiment. The memory 11 includes not only a RAM but also a flash memory (EEPROM) serving as a nonvolatile memory, ROM, etc., and stores various kinds of data and program necessary to control the CPU 10.

The CPU 10 has an internal timer 101 for measuring a time interval. The internal timer 101 is comprised of a free run timer starting in synchronism with time data sent from a host system 30 as will be set out below. Using a measuring time and time data 110 output from the internal timer 101, the CPU 10 generates, while updating at a predetermined time interval, time data indicating the time of day, date and year.

The HDC 9 serves as an interface between the drive 20 and the host system 30 such as a personal computer and digital device. The HDC 9 has various kinds of register groups 90 such as a register for holding a command from the host system 30 and a register for holding error information. The CPU 10 gains access to the register group 90 and performs the data read/write operations.

(Generation of Time Data and Error Processing)

The operation of the first embodiment will be explained below by referring to not only FIG. 1 but also FIGS. 2 to 5.

First, as shown in FIG. 2, at a power ON time, the HDC 9 of the present disk drive 20 receives time data 110 sent from the host system 30—step S1. The CPU 10 allows the time data 110 which is received at the HDC 9 to be stored at a predetermined area in the RAM included in the memory 11—step S2. That is, the CPU 10 allows the time data 110 which is synchronized with an internal time of the host system 30 to be stored in the memory 11.

The CPU 10 starts the internal timer 101 using a given time (including the time of day, date and year) of the time data 110 as a standard time point step—S3.

Here, the host system 30 transfers, at the power ON time, the time data which is generated in the host system 30 to the disk drive 20 by the use of, for example, a time-of-day notifying command. In more detail, the host system 30 sets respective data of the time-of-day (hour, minute, second), date and year to, for example, a head register (head number holding register), sector number register, sector count register, cylinder register, etc., in the register group 90 of the HDC 9.

In accordance with the time-of-day notifying command from the host system 30, the disk driver 20 recognizes, for example, "16:00:00 on March 14" as the current time (reference time of the disk drive 20). The internal timer 101 starts the counting of a time interval from the reference time.

Then, as shown in FIG. 3, when a read/write command is issued from the host system 30, the disk drive 20 performs a read/write operation. Here it is supposed that an error, such as a read error, occurs (YES of step S4).

The CPU 10 adds an elapsed time (for example, "3662 seconds") which is output from the internal timer 101 to the time data 110 stored in the RAM and calculates time stamp information representing an error occurring time (step S5). In more detail, the CPU 10 adds "3662 seconds" which is obtained from the internal timer 101 to the time data 110 (16:00:00 on March 14) and calculates time stamp information representing "17:01:02 on March 14" (year is omitted for convenience sake).

The CPU 10 allows any error information which represents the content of an "occurred" error (here a read error) to be stored in the system area 100 of the disk medium 1 using the time stamp information representing the "error generated" time-of-day as attribute information—step S6.

Here, the error information is stored in the system area 100 in a form to, as shown in FIG. 4 for example, secure a correspondence between the error content representing information 300 and the time stamp information 301. In a normal situation, a plurality of error information are reserved as error log information (error log file) in the system area 100.

By issuing a specified command called an error log read (REL) command, the host system 30 can read out the error log information from the system area 100 in the drive 20. An explanation will be made below about this by referring to the flowchart of FIG. 5.

When the HDC 9 of the disk drive 20 receives the REL command from the host system 30, the CPU 10 starts an error log information read operation—step S10.

The CPU 10 effects drive control of the actuator to allow the magnetic head 2 to be set to the system area 100 of the disk medium 1 and, by doing so, read access is carried out—step S11. That is, the R/W channel 8 reproduces the error log information which is read out from the system area 100 through the magnetic head 2 and delivers it to the HDC 9—step S12. The HDC 9 receives the error log information read out from the R/W channel 8 through the magnetic head 2 and transfers it to the host system 30—step S13.

By doing so, the host system 30 can obtain any error log information from the disk drive 20 and perform various kinds of processing relative to the occurrence of an error in the disk drive 20. In this case, for each error information involved, time data which is synchronized with the internal time of the host system 30 is attached to the error log information. Thus, the host system 30 can obtain not a relative time of the disk drive 20 but the time stamp information representing an "error generated" time-of-day and recognize any error generated in association with an actual time of the read/write operation.

Although the error generated in the disk drive 20 has been explained as a practical example in connection with the present embodiment, the present invention can be applied even to the management of other events in the disk drive 20. That is, the disk drive 20 generates a time stamp information in synchronism with the time of the host system 30 and records the time stamp information in association with the time of any generated event. Even in the case of obtaining an event content other than the generated error, therefore, it is possible to always recognize any specific situation generated time.

As will be seen from the above, the CPU 10 receives the time data transferred from the host system 30 and generates the time data synchronized with the operation time of the host system 30. At the time of the error occurring, for example, the CPU 10, while using the time data, can record, together with the error information, the time data representing the "error generated" time as time stamp information in the disk medium 1 for example. Thus, when any error information is obtained from the disk drive 20, the host system 30 can also obtain the time stamp information representing the error generated time. By doing so, the host system 30 can recognize an event, such as any error, generated in associated with an actual time of the data read/write operation in the disk drive 20.

(Variant)

Figure 6:
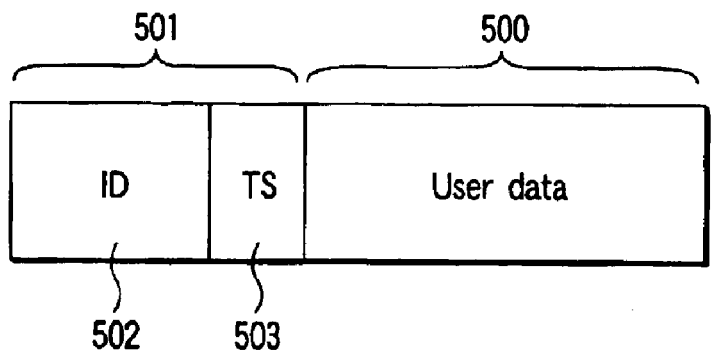
FIG. 6 is a view showing a variant of the first embodiment.

FIG. 6 shows a variant of the first embodiment.

This variant is comprised of a system for recording time stamping information (TS), which is calculated under the CPU 10, not only in the system area 100 but also in each data sector of a disk medium 1.

The respective data sectors denote data areas into which a track (cylinder) on the disk medium 1 is divided. The respective data sector generally comprises a user data recording area 500 and an ID area 501 where ID information 502 is recorded. In a practical application, the ID area 501 includes an available area 503 between the area of the ID information 502 and the user data area 500.

In the present variant, at a write operation time for example, time stamp information (TS) representing a write time of day is recorded in the available area 503 under control of the CPU 10 at each data sector in which data is recorded.

Under such a system, at a read operation, the CPU 10 can read, together with the user data, the time stamp information (TS) from the available area 503 and transfer them to the host system 30. By doing so, the host system 30 can recognize the time of day when the user data of a data sector unit is recorded.

(Second Embodiment)

Figure 7:
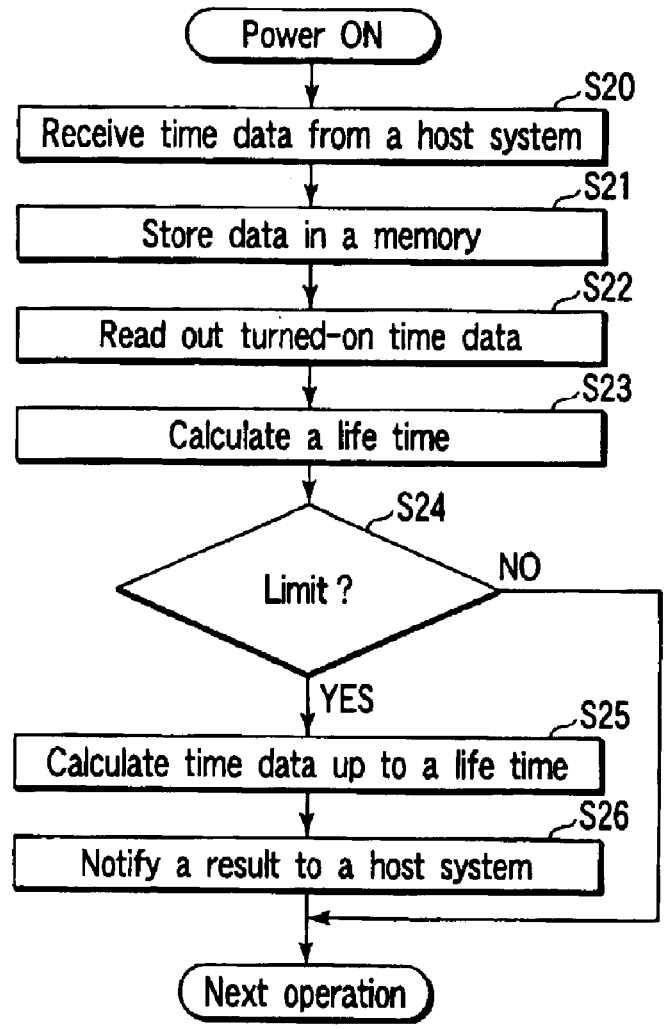
FIG. 7 is a flowchart showing the steps of a life time notice process relating to the second embodiment.

FIG. 7 is a flowchart relating to a second embodiment. The second embodiment is supposed to have a disk drive 20 of a structure as shown in FIG. 1.

First, a disk drive 20 measures a turned-ON time from a power ON time to a power OFF time and allows the turned-ON time data to be recorded on a system area of a disk medium 1. In this case, a CPU 10 additively integrates a current turned-ON time to a past turned-ON time as an integrating value and records corresponding turned-ON time data. In a normal situation, the turned-ON time data corresponds to an integrated value from the shipping of the drive 20 to a current turned-ON time.

With reference to FIG. 7, the present embodiment will be explained in more detail below in connection with the disk medium drive 20 having such a function.

At a power ON time, an HDC 9 of the disk medium drive 20 receives time data 110 sent from a host system 30—step S20. The CPU 10 allows time data 110 which is received by the HDC 9 to be stored in a RAM of a memory 11 at a predetermined area—step S21. That is, the CPU 10 allows time data 110 which is synchronized with a time of the host system 30 to be stored in the memory 11. Further, the CPU 10 starts an internal timer 101 using a given time (including the time of day, date and year) of the time data 110 as a reference time point.

Then, the CPU 10 reads out turned-ON time data stored in a system area 100 on a disk medium 1—step S22. Further, the CPU 10 reads out life time-related data initially stored in the system area 100.

Using the turned-ON time data and life time-related data, the CPU 10 calculates a time up to an end of a life time at a current time point—step S23. The CPU 10 decides whether or not a limit of the life time is reached from the calculated time step—S24. In more detail, the CPU 10 decides whether or not a residual time interval up to the end of the life time is adequate relative to a predetermined time. If the CPU 10 decides that the residual time up to the end of the life time is adequate, a shift is made to a normal read/write operation (NO of step S24).

If, on the other hand, the CPU 10 decides that the limit of the life time is reached, the CPU 10 calculates time data (date and time of day) up- to the end of the life time—step S25. In more detail, the CPU 10 adds a lapsed time (for example, 3662 seconds) which is output from an internal timer 101 to the time data 110 stored in a RAM and calculates time stamp information representing a time of day at a current time point. Then the CPU 10 adds a residual time up to the end of the life time to the time stamp information and calculates the time-of-day data up to the end of the life time.

The CPU 10 gives the time-of-day data up to the end of the calculated life time, as an advance notice of the life time, to a host system 30 through an HDC 9—step S26. Or, the CPU 10 may record the advance notice information on the system area 100 on the disk medium. The host system 30 may be of such a type as to issue a specified read command and read out the advance information from the system area 100.

In short, the present embodiment above constitutes a system for initially managing an event on the end of the life time. That is, the time-of-day (time and date) up to the end of the life time is calculated by the utilization of the time data generated in the disk drive 20 and a result is noticed as advance information to the host system 30. Thus, especially where there is less time left as a residual life time of the drive 20, the host system 30 can initially recognize this as an advance notice. By doing so it is possible to initially prevent any sudden stop or failure resulting from the approaching limit of the life time.

The system of the present invention, if being applied to a disk drive for frequently used business personal computers, is very effective. Since the user can initially know the approaching limit of the life time of the disk drive used, it is possible to initially prevent any such adverse situation in which the data recorded on the drive will be lost due to a sudden stopping, etc., of the disk drive.

In the respective embodiment, the host system 30 is supposed to have such a structure by which the time data is calculated based on the reception of given time-of-day data from the host system 30. A method for inputting the time-of-day data from the outside is not restricted to the case of doing this particularly from the host system to the drive disk 20. In more detail, another method may be adopted by which, for example, the time data is received via a radio wave. Although the respective embodiment has been explained as being applied to a hard disk drive, the present invention is not restricted thereto and can be applied to a magneto-optical disk medium drive, etc.

According to the respective embodiments, as set out above, the disk drive 20 may be so configured as to be able to record a time synchronized to any external time upon the occurrence of any event and, by doing so, to enhance the function of management for any event such as an error occurrence, approaching limit of a life time, etc. It is thus possible to provide a disk medium recording apparatus of high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a disk medium configured to record data, wherein life time information representing a useful life time limit of the disk drive being initially recorded in a system area of the disk medium;

a read/write unit configured to perform a read/write operation of data on the disk medium;

a timer unit configured to generate time data synchronized with any external time;

an event controller configured to, when any predetermined event occurs in the drive, record event information representing the content of the event and time data representing the event occurring time in a correspondence form;

a turn-ON controller configured to measure turned-ON time data from a power ON time and store the turned-ON time data on the disk medium in the system area; and a life controller configured to read out the life time information and turned-ON time data from the system area and, based on the turned-ON time data and life time information, calculate the time data up to the life time limit of the disk drive.

2. A disk drive according to claim 1, wherein the event controller is configured to, upon the occurrence of an error, record error information representing error content together with the time data.

3. A disk drive according to claim 1, wherein the timer unit further includes a memory configured to receive time data representing the time of day or time and date supplied from an external device and store the time-of-day data, the timer unit measuring an elapsed time using the time-of-day data as a reference end updating the time data at a predetermined time interval.

4. A disk drive according to claim 3, further comprising a controller configured to, upon receipt of an initially set error information read command from an external device, read out the error information and time data recorded under said event controller and transfer these to the external device.

5. A disk drive according to claim 1, wherein the event controller allows error information including the time data as attribute information to be stored on the disk medium.

6. A disk drive according to claim 1, further comprising a controller configured to, upon receipt of an initially set error information read command from an external device, read out the event information and time data recorded under said event controller and transfer these to the external device.

7. A disk drive according to claim 1, wherein the timer unit further includes a memory configured to receive time data representing the time of day or time and date received from the external device at a power ON time and store the data, the timer unit starting the measuring of a time interval upon receipt of the time data and updating the time data at a predetermined time interval using the time data as a reference.

8. A disk drive according to claim 1, wherein said life controller notifies the calculated time data to a host system.

9. A method for event management for a disk drive, the method comprising:

starting time measurement at power ON time and generating time data at a predetermined interval, synchronized with an external time;

detecting an error which occurs during operation of the disk drive;

at an error occurring time, recording error information indicating error content and time data indicating the error occuring time in a correspondence form, wherein life time information representing a useful life limit time of the disk drive is initially recorded on a disk medium in a system area;

measuring a turned-ON time from a power ON time and storing the tuned-ON time data on the disk medium in the system area; and reading out the life time information, and turned-ON time data and, based on the turned-ON time and life time information, calculating the time data up to the life limit of the disk drive.

10. A method according to claim 9, further comprising:

at a power ON time, receiving time data representing the time of day or time and date supplied from an external device and storing the data; and measuring a lapsed time using the time data as a reference and updating the time data at a predetermined interval.

11. A method according to claim 9, further comprising:

upon receipt of an initially set read command from en external device, reading out the error information and time data from the disk medium and transferring these to the external device.

* * * * *